United States Patent
Miyamoto et al.

(10) Patent No.: US 12,169,956 B2
(45) Date of Patent: Dec. 17, 2024

(54) IMAGE RECOGNITION METHOD USING A PLURALITY OF MACHINE-LEARNED INFERENCE DEVICES, IMAGE RECOGNITION APPARATUS FOR THE SAME, AND NON-TRANSITORY COMPUTER READABLE RECORDING MEDIUM STORING A PROGRAM OF THE SAME

(71) Applicant: KYOCERA Document Solutions Inc., Osaka (JP)

(72) Inventors: Takuya Miyamoto, Osaka (JP); Kazunori Tanaka, Osaka (JP); Kanako Morimoto, Osaka (JP); Rui Hamabe, Osaka (JP); Naomichi Higashiyama, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 293 days.

(21) Appl. No.: 17/563,355

(22) Filed: Dec. 28, 2021

(65) Prior Publication Data
US 2022/0207853 A1 Jun. 30, 2022

(30) Foreign Application Priority Data
Dec. 28, 2020 (JP) ................. 2020-218477

(51) Int. Cl.
*G06V 10/77* (2022.01)
*G06N 20/00* (2019.01)
*G06V 10/422* (2022.01)

(52) U.S. Cl.
CPC .......... *G06V 10/422* (2022.01); *G06N 20/00* (2019.01); *G06V 10/7715* (2022.01)

(58) Field of Classification Search
None
See application file for complete search history.

(56) References Cited

U.S. PATENT DOCUMENTS 11,928,601 B2 * 3/2024 Alon ................. G06N 3/044
2018/0314919 A1 * 11/2018 Onozawa ............ G06V 10/762
(Continued)

FOREIGN PATENT DOCUMENTS

JP 2009-026326 2/2009
JP 2017-013375 1/2017
(Continued)

OTHER PUBLICATIONS

JPO, Office Action of JP 2020-218477 dated Aug. 20, 2024.

*Primary Examiner* — Rinna Yi
(74) *Attorney, Agent, or Firm* — LEX IP MEISTER, PLLC

(57) ABSTRACT

An image recognition method includes a feature amount extracting step of generating, from an input image, a base feature map group including a plurality of base feature maps; an inferring step of deriving a plurality of inference results using each of a plurality of machine-learned inference devices for a plurality of inference inputs based on the base feature map group; and an integrating step of integrating the plurality of inference results by a specific manner to derive a final inference result, where each of the plurality of inference inputs has some or all base feature maps of the plurality of base feature maps, and each of the plurality of inference inputs has the some or all base feature maps that are different in part or whole from the some or all base feature maps of another inference input in the plurality of inference inputs.

7 Claims, 5 Drawing Sheets

(56) References Cited

U.S. PATENT DOCUMENTS

| | | | | |
|---|---|---|---|---|
| 2019/0199883 | A1* | 6/2019 | Nojiri | H04N 1/00474 |
| 2020/0192726 | A1* | 6/2020 | Joo | G06F 9/5083 |
| 2020/0226462 | A1* | 7/2020 | Maddison | G01N 33/53 |
| 2021/0011732 | A1* | 1/2021 | Botimer | G06F 17/153 |
| 2021/0276574 | A1* | 9/2021 | Efrat Sela | G06N 3/045 |
| 2023/0144209 | A1* | 5/2023 | Cai | G06T 5/20 |
| | | | | 348/148 |

FOREIGN PATENT DOCUMENTS

| | | |
|---|---|---|
| JP | 2018-005520 | 1/2018 |
| JP | 2019-020138 | 2/2019 |

\* cited by examiner

IMAGE RECOGNITION METHOD USING A PLURALITY OF MACHINE-LEARNED INFERENCE DEVICES, IMAGE RECOGNITION APPARATUS FOR THE SAME, AND NON-TRANSITORY COMPUTER READABLE RECORDING MEDIUM STORING A PROGRAM OF THE SAME

INCORPORATION BY REFERENCE

This application is based upon and claims the benefit of priority from the corresponding Japanese Patent Application No. 2020-218477 filed on Dec. 28, 2020, the entire contents of which are incorporated herein by reference.

BACKGROUND

The present disclosure relates to an image recognition method, an image recognition apparatus, and a non-transitory computer readable recording medium storing an image recognition program.

In recent years, an inference device (classifier or the like) obtained by machine-learning has been put into practical use.

In general, in such an inference device, a large amount of training data is required in order to obtain an inference result with sufficient accuracy, and in a case of relatively small amount of training data, a favorable inference result is not always obtained due to bias of training data.

Group learning may be used to suppress the influence of such a bias of the training data. In group learning, a plurality of inference devices that are highly independent of each other are used, and one final inference result is obtained from the inference results of the plurality of inference devices by majority decision or the like.

On the other hand, in an image recognition field, a certain image processing apparatus applies a spatial filter for extracting specific shapes (lines or the like) of a plurality of sizes and a plurality of directions to an input image to be subjected to image recognition, and detects a specific shape of a certain size facing a certain direction included in the input image.

In addition, a certain inspection device (a) derives a determination result of whether or not an abnormality is included in an input image using a machine-learning model, and (b) calculates a degree of association between an image including the abnormality and the input image and a degree of association between an image not including the abnormality and the input image, and evaluates the reliability of the determination result based on the degree of association.

Machine-learning of each inference device could be performed on the group learning of a plurality of inference devices (classifiers or the like) for image recognition based on the feature amount indicating the specific shape detected as described above, but it is difficult to prepare the feature amount for outputting an inference result with high independency and sufficient accuracy, which is necessary for group learning, as training data for a plurality of inference devices for image recognition.

SUMMARY

An image recognition method according to the present disclosure includes a feature amount extracting step of generating, from an input image, a base feature map group including a plurality of base feature maps; an inferring step of deriving a plurality of inference results using each of a plurality of machine-learned inference devices for a plurality of inference inputs based on the base feature map group; and an integrating step of integrating the plurality of inference results by a specific manner to derive a final inference result. Each of the plurality of inference inputs has some or all base feature maps of the plurality of base feature maps. Each of the plurality of inference inputs has the some or all base feature maps that are different in part or whole from the some or all base feature maps of another inference input in the plurality of inference inputs.

An image recognition apparatus according to the present disclosure includes a feature amount extraction unit that generates, from an input image, a base feature map group including a plurality of base feature maps; a plurality of machine-learned inference devices that derive a plurality of inference results for a plurality of inference inputs based on the base feature map group; and an integrator that integrates the plurality of inference results by a specific manner to derive a final inference result. Each of the plurality of inference inputs has some or all base feature maps of the plurality of base feature maps. Each of the plurality of inference inputs has the some or all base feature maps that are different in part or whole from the some or all base feature maps of another inference input in the plurality of inference inputs.

A non-transitory computer readable recording medium according to the present disclosure stores an image recognition program executable by a processor. The image recognition program causes the processor to operate as the feature amount extraction unit, the plurality of machine-learned inference devices, and the integrator.

DETAILED DESCRIPTION

Hereinafter, a description is given of the present disclosure according to a first embodiment of the present disclosure, with reference to the figures.

Figure 1:
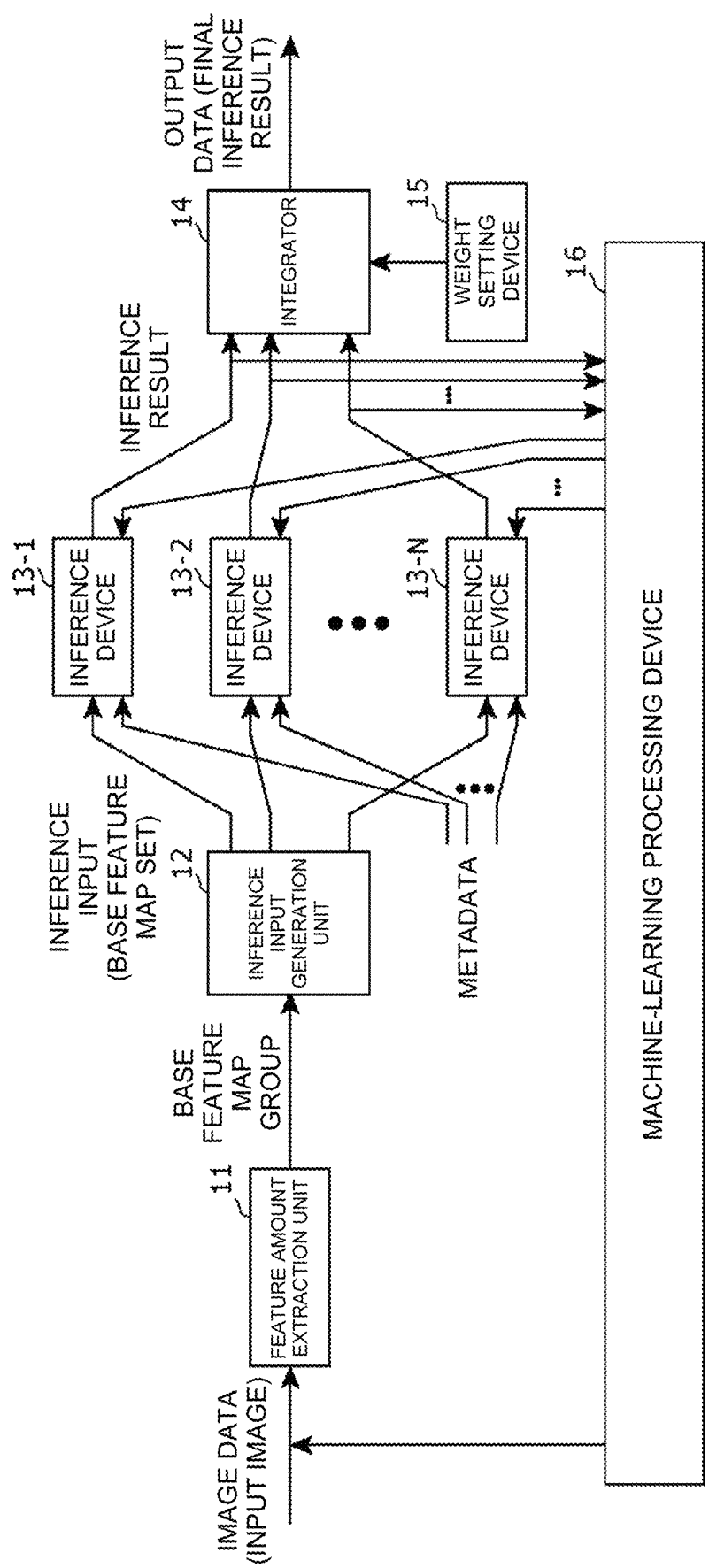
FIG. 1 is a block figure illustrating a configuration of an image recognition apparatus according to an embodiment of the present disclosure.

FIG. 1 is a block figure illustrating a configuration of an image recognition apparatus according to an embodiment of the present disclosure. The image recognition apparatus shown in FIG. 1 is an electronic device such as a multi-function peripheral or a scanner, a terminal device such as a personal computer, a server on a network, or the like, and causes a built-in computer to function as a processing unit described below by executing an image recognition program on the computer.

The image recognition apparatus illustrated in FIG. 1 includes a feature amount extraction unit 11, an inference input generation unit 12, inference devices 13-1 to 13-N (N>1), an integrator 14, a weight setting device 15, and a machine-learning processing device 16.

The feature amount extraction unit 11 is a processing unit that generates a base feature map group including a plurality of base feature maps from an input image.

The input image is an image to be recognized, such as an image read by a scanner (not shown in Figures), an image based on image data received by a communication apparatus (not shown in Figures), or an image based on image data stored in a storage device (not shown in Figures).

The plurality of base feature maps described above are respectively extracted from the input image by a plurality of specific processes (here, spatial filter processes). For example, several tens to several hundreds of base feature maps are generated and used as one base feature map group.

Figure 2:
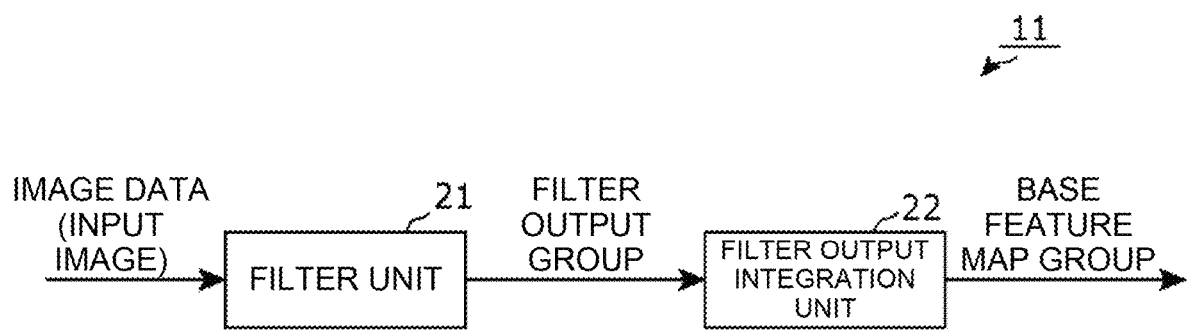
FIG. 2 is a block figure indicating the configuration of the feature amount extraction unit 11 in FIG. 1.
Figure 3:
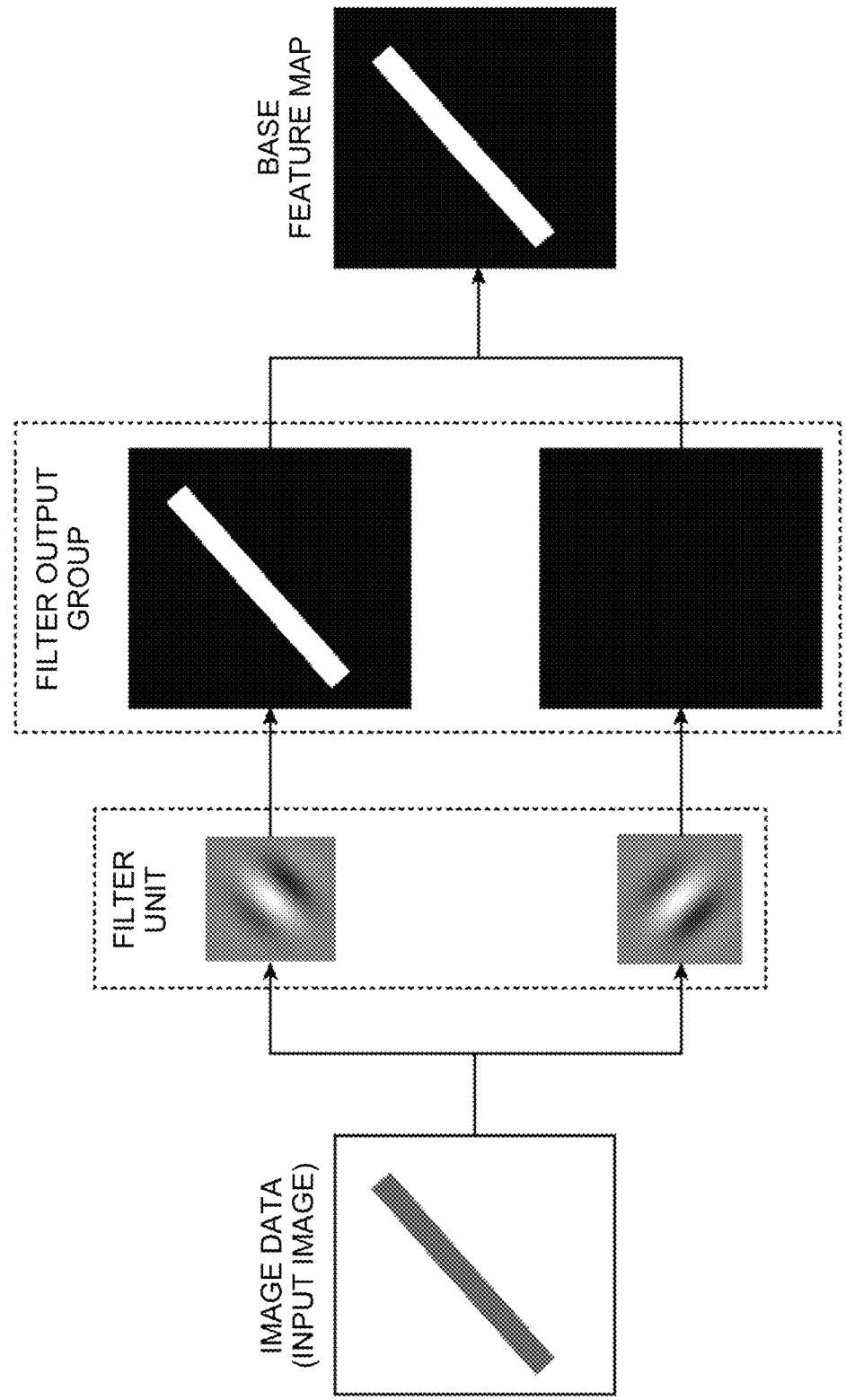
FIG. 3 is a figure for describing an example of the operation of the feature amount extraction unit 11 shown in FIG. 2.

FIG. 2 is a block figure indicating the configuration of the feature amount extraction unit 11 in FIG. 1. FIG. 3 is a figure for describing an example of the operation of the feature amount extraction unit 11 shown in FIG. 2.

As illustrated in FIG. 2, the feature amount extraction unit 11 includes a filter unit 21 and a filter output integration unit 22. The filter unit 21 performs filter processing on an input image using a plurality of spatial filters having specific characteristics, and the filter output integration unit 22 generates a base feature map based on a plurality of filter processing results obtained by the filter unit 21 at each position of the input image.

For example, as illustrated in FIG. 3, in order to detect a specific shape (a line such as a straight line or a curved line, a point, a circle, a polygon, or the like), a plurality of spatial filters having different detection sensitivities depending on directions are used for each of a plurality of sizes, and a base feature map including a shape of a logical sum of filter outputs of the plurality of spatial filters is generated. For example, when a line shape appears only in the filter output of a certain spatial filter and no shape appears in the filter outputs of all the other spatial filters, a base feature map including the line shape is generated. In addition, for example, in a case where a linear shape appears in filter outputs of the plurality of spatial filters, a base feature map including a point at an intersection of the linear shapes (that is, a point shape serving as a logical product of the linear shape) is generated.

For example, a two-dimensional Gabor filter is used as the spatial filter. In this case, a two-dimensional Gabor filter having filter characteristics adjusted to a spatial frequency corresponding to the size of the detection target is used. In addition, a secondary differential spatial filter that detects an edge of a shape may be used as the spatial filter.

Here, the base feature map has two-dimensional data indicating positions, sizes, and directions of a plurality of specific shapes, and for example, the plurality of specific shapes are detected in the input image by spatial filter processing as the specific processing described above. Further, the base feature map may be image data of a specific color (each color plane) of the input image. As described above, the base feature map having the shape information and the base feature map having the color information are used as necessary.

The inference input generation unit 12 is a processing unit that executes an inference input generation step of generating a plurality of inference inputs from the base feature map group described above. The plurality of inference inputs are input data respectively input to the inference device 13-1 to 13-N.

The plurality of inference inputs described above have some or all base feature maps of the plurality of base feature maps described above, respectively. Further, each of the plurality of inference inputs has the some or all base feature maps that are different in part or whole from the some or all base feature maps of another inference input in the plurality of inference inputs.

One of the pluralities of inference inputs described above may have all the base feature maps of the base feature map group.

For example, each of the plurality of inference inputs described above has one or more of base feature maps selected from the base feature map group corresponding to the plurality of specific processes described above.

Figure 4:
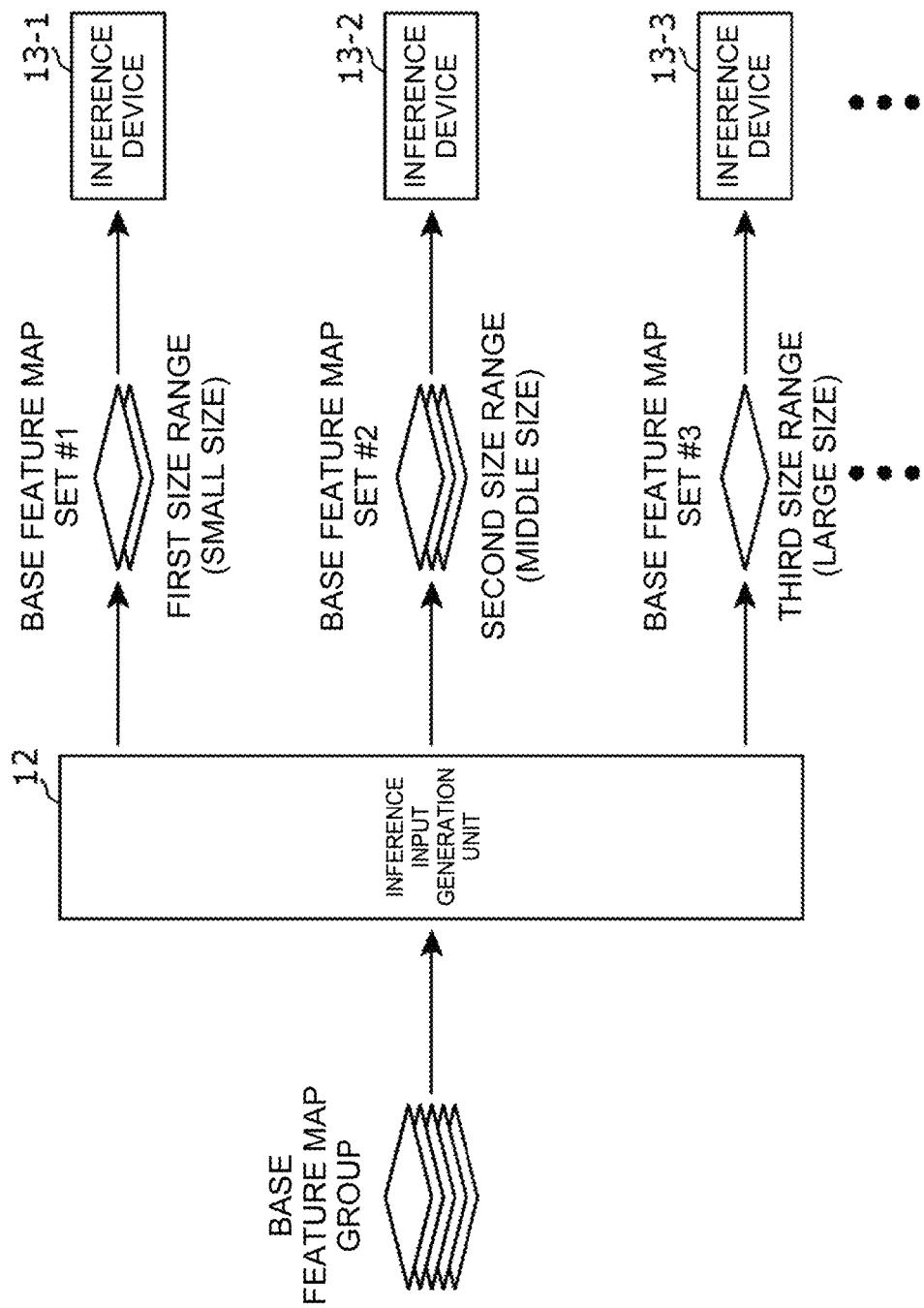
FIG. 4 is a figure for describing an example of the operation of the inference input generation unit 12 in FIG. 1.

FIG. 4 is a figure for describing an example of the operation of the inference input generation unit 12 in FIG. 1. For example, as illustrated in FIG. 4, the plurality of inference inputs described above are, for example, one or more of base feature maps classified by the size. Specifically, a plurality of size ranges are set, and for each size range, one or more of base feature maps (hereinafter, referred to as a base feature map set) in which the size of a specific shape belongs to the size range are set as one inference input. That is, here, the classification is performed by the size, and is not performed by the position and the method. A part or the entirety of each size range may overlap with another size range.

Each inference input may include data (metadata such as parameters that may affect the inference result) other than one or more of base feature maps selected from the base feature map group. Examples of such metadata include environmental data (temperature, humidity, time, state information of an imaging target, and the like. For example, in a case where the input image is a photographic image captured by a camera, environmental data at the time of imaging), knowledge information (position and size of a region to be noticed), and the like are used.

In training data used for machine-learning of an inference device 13-$i$, such an input image is used, from which a base feature map, in which positions and directions of specific shapes are distributed in all directions without bias, can be obtained.

The inference devices 13-1 to 13-N are processing units that derive a plurality of inference results (such as classification results) for a plurality of inference inputs based on the above-described base feature map group, and are processing units subject to machine-learning such as deep learning. For example, each inference device 13-$i$ ($i$=1 to N) is a convolutional neural network (CNN). For example, the inference devices 13-1 to 13-N are deemed to be three or more inference devices.

The integrator 14 is a processing unit that integrates a plurality of inference results obtained by the inference devices 13-1 to 13-N in a specific manner (majority decision, class membership probability, etc.) to derive a final inference result.

For example, the integrator 14 derives a final inference result by majority decision on a plurality of inference results, or derives a final inference result based on an average value or a total value of class membership probabilities for a plurality of classes for a plurality of inference results.

In this embodiment, the integrator 14 integrates the plurality of inference results by a specific manner in consideration of the weight factors for the plurality of inference results to derive a final inference result. The final inference result may be derived by integration without considering the weight factor. As the reliability of the inference result is higher, the weight factor is increased.

The integrator 14 may be a machine-learned integrator, and may integrate the plurality of inference results to derive a final inference result. The integrator 14 may integrate the plurality of inference results using another existing manner to derive the final inference result.

The weight setting device 15 is a processing unit that derives the above-described weight factor and sets the same in the integrator 14. The value of the weight factor may be set on the basis of a manually input value, or may be automatically set as follows.

For example, the weight setting device 15 may derive the above-described weight factor based on the inference accuracy of each of the inference devices 13-1 to 13_N and set the same to in the integrator 14.

In this case, for example, the machine-learning processing device 16, which will be described later, may derive the inference accuracy of each inference device 13-$i$ by cross validation (a validation method in which, a process of: dividing training data; deriving an inference result by using a part thereof for machine-learning; and using the rest thereof for validation of the inference result, is repeatedly performed by changing a division pattern), and the weight setting device 15 may derive the weight factor for the inference results of the inference devices 13-1 to 13-N on the basis of the inference accuracy of the inference devices 13-1 to 13-N derived by the machine-learning processing device 16.

In this case, case, for example, the inferential accuracy of each inference device 13-$i$ may be inferred from the input image by an image recognition algorithm using CNN or the like.

Further, for example, the weight setting device 15 may derive the above-described weight factor on the basis of the distribution of the specific feature amounts (shape, color, and the like) of the input image and the distribution of the specific feature amounts of the input image of the training data used for machine-learning of the inference devices 13-1 to 13-N, and may set the weight factor in the integrator 14.

Figure 5:
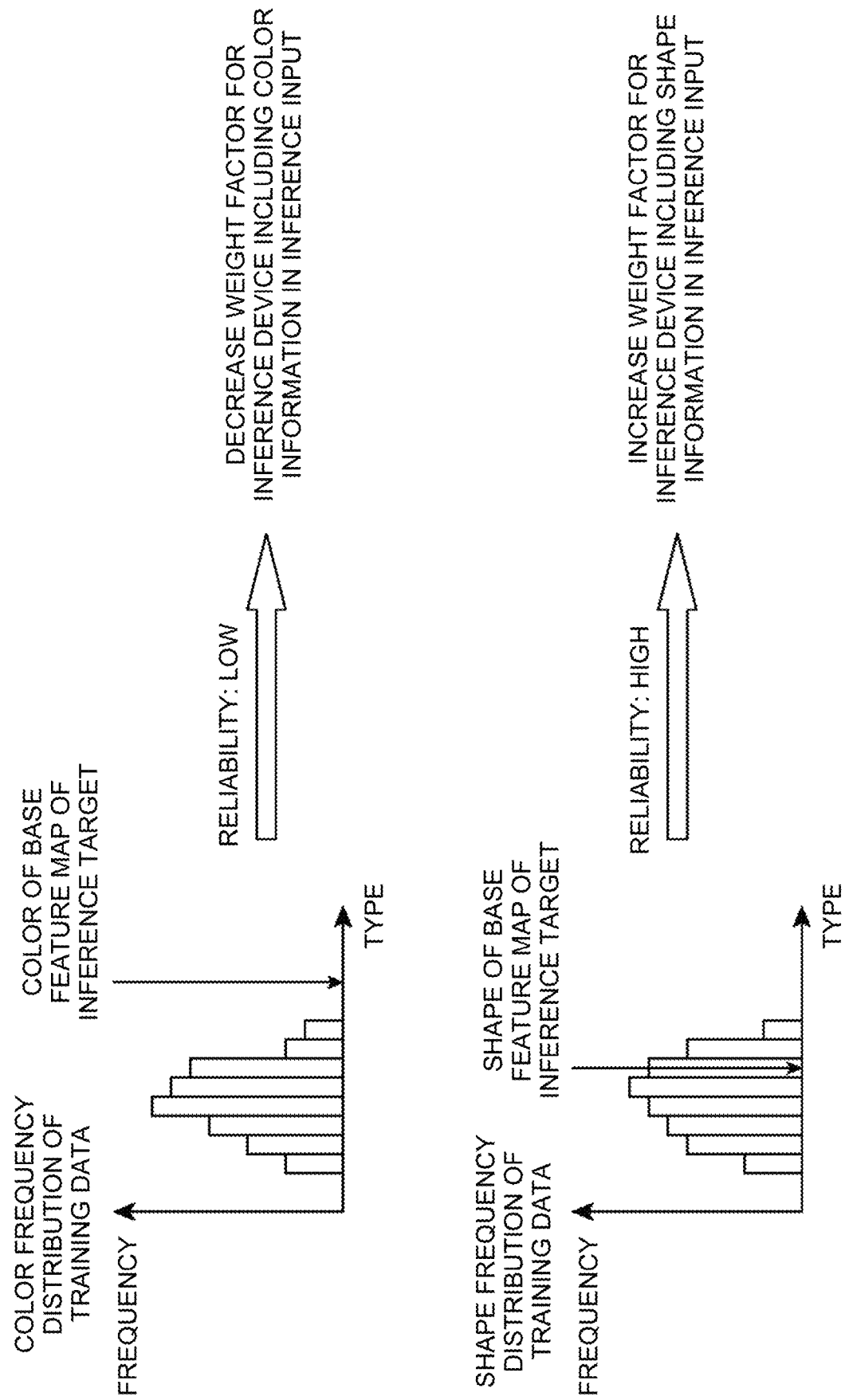
FIG. 5 is a figure for describing an example of the derivation of the weight factor used by the integrator 14 in FIG. 1.

FIG. 5 is a figure for describing an example of the derivation of the weight factor used by the integrator 14 in FIG. 1. For example, as shown in FIG. 5, a frequency distribution of a shape (a circle, a rectangle, a triangle, or the like) and a frequency distribution of a color (blue, red, green, or the like) of an object in a base feature map obtained from an input image of training data are derived in advance at the time of machine-learning, and (a value of) a weight factor is determined corresponding to a frequency in the frequency distribution of the shape and the color of the object in the base feature map obtained from the input image of the image recognition target. That is, as the frequency is higher, the corresponding weight factor is set to be larger.

For example, in the inference devices 13-1 to 13-N, in a case where there are an inference device 13-$i$ in which a base feature map for a specific shape is an inference input and an inference device 13-$j$ in which a base feature map for color information (R-plain image, G-plain image, B-plain image, or the like, of an input image) is an inference input, as shown in FIG. 5, in a case where a frequency for a shape is high but a frequency for a color is low, a weight factor for the inference device 13-$i$ is set high and a weight factor for the inference device 13-$j$ is set low.

Further, each input image in the training data may be converted into an image indicating a feature amount extracted by feature extraction processing using an auto-encoder or the like, the distribution of the specific feature amount of the training data may be derived based on the image after the conversion, the input image of the image recognition target may be similarly converted into an image indicating a feature amount by the feature extraction processing, the specific feature amount of the input image of the image recognition target may be derived based on the image after the conversion, and thereby the weight factor may be set based on the distribution of the specific feature amount of the training data and the specific feature amount of the input image of the image recognition target as described above.

The machine-learning processing device 16 is a processing unit that executes a machine-learning step of performing machine-learning of the inference devices 13-1 to 13-N according to an existing learning method corresponding to the inference devices 13-1 to 13-N computation model (in this case, CNN). In the machine-learning of the inference devices 13-1 to 13-N, the machine-learning of each inference device 13-$i$ is independently executed.

For example, training data including a plurality of pairs of an input image and a final inference result is prepared in a storage device or the like that does not allow a figure and the machine-learning processing device 16 acquires the training data, inputs the input image of each pair to the feature amount extraction unit 11, acquires an inference result output from each inference device 13-1 to 13-N corresponding to the input image, and adjusts a parameter value of each inference device 13-$i$ (a weight or a bias value of the CNN) independently of other inference device 13-$j$ on the basis of a result of comparison between the output inference result and the final inference result of the training data pair.

The machine-learning processing device 16 may perform machine-learning by excluding a region other than the specific partial region designated by the training data in the input image of the training data used for the machine-learning described above.

That is, in this case, since machine-learning is performed by designating a region to be noticed in image recognition (a region in which a specific component in a machine or the like appears, a region in which an abnormality to be detected in image recognition may occur, or the like) as a specific partial region and excluding other regions, the machine-learning efficiently proceeds. For example, machine-learning is efficiently performed with a relatively small amount of training data by extracting a base feature map having a specific shape corresponding to a specific abnormality to be detected by image recognition only in a region where the specific abnormality may occur.

In a case where the machine-learning of the inference devices 13-1 to 13-N is completed, the machine-learning processing device 16 may not be provided.

Next, the operation of the image recognition apparatus shown in FIG. 1 will be described.

(a) Machine-Learning of Inference Device 13-1 to 13-N

As training data, a plurality of pairs of an input image and a final inference result (that is, a correct image recognition result) are prepared in a storage device or the like not shown in the figures. Then, the machine-learning processing device 16 performs machine-learning of the inference devices 13-1 to 13-N using the training data.

In the machine-learning, when the machine-learning processing device 16 selects one piece of training data and inputs one input image of the training data to the feature amount extraction unit 11, the feature amount extraction unit 11 generates a base feature-up group from the input image, and the inference input generation unit 12 generates each inference input from the base feature-up group and inputs the inference input to each inference device 13-$i$. Then, each of the inference devices 13-1 to 13-N derives an inference result for an inference input, based on the current state (such as the parameter value of CNN). Then, the machine-learning processing device 16 compares the inference result corresponding to the input image of the training data with the final inference result of the training data and updates the state of each inference device 13-1 to 13-N based on the comparison result using a specific algorithm.

In machine-learning, this series of processing is repeatedly executed according to a specific machine-learning algorithm based on the value of a hyperparameter such as the number of epochs.

(b) Image Recognition of an Input Image of an Image Recognition Target

Image recognition for the input image of the image recognition target is executed after the above-described machine-learning. In this case, an input image (input image data) acquired by a controller or the like not shown in the figures is input to the feature amount extraction unit 11. When the input image is input to the feature amount extraction unit 11, the feature amount extraction unit 11 generates a base feature-up group from the input image, and the inference input generation unit 12 generates each inference input from the base feature-up group and inputs the generated inference input to each inference device 13-i. Then, each of the inference devices 13-1 to 13-N derives an inference result for an inference input based on the machine-learned state (such as the parameter value of CNN). Then, the integrator 14 derives a final inference result from these inference results and outputs the same.

As described above, according to the above embodiment, in the feature amount extracting step, a base feature map group including a plurality of base feature maps is generated from an input image, in the inferring step, a plurality of inference results are derived using the machine-learned inference devices 13-1 to 13-N for a plurality of inference inputs based on the base feature map group, and in the integrating step, the plurality of inference results are integrated in a specific manner to derive a final inference result. Each of the plurality of inference inputs has some or all base feature maps of the plurality of base feature maps. Each of the plurality of inference inputs has the some or all base feature maps that are different in part or whole from the some or all base feature maps of another inference input in the plurality of inference inputs.

Accordingly, since a plurality of base feature maps indicating various feature amounts are generated from an input image, combinations of the plurality of various base feature maps, from among the plurality of base feature maps, are used as an inference input, to obtain inference results in the inference devices 13-1 to 13-N, and a final inference result is derived by integrating the inference results, group learning of image recognition is possible using feature amounts for outputting an inference result with high independence and sufficient accuracy even with a relatively small amount of training data, and a favorable inference result is derived by using the inference devices 13-1 to 13-N subjected to thus performed group learning.

Further, since a favorable inference result is obtained with a relatively small amount of training data, even in a case where the amount of training data is small in an individual and small-scale site that requires image recognition, a favorable inference result suitable for the site is obtained. Further, the input of each inference device 13-i is visualized by the base feature map, and the description of the input/output relationship of each inference device 13-i becomes easy.

Various changes and modifications to the above-described embodiments will be apparent to those skilled in the art. Such changes and modifications may be made without departing from the spirit and scope of the subject matter and without diminishing its figure and advantages. That is, it is intended that such changes and modifications are included in the scope of the claims.

For example, in the above-described embodiment, each of the inference devices 13-1 to 13-N may include a plurality of layers of inference devices, and each inference device 13-i may derive an inference result using the plurality of layers of inference devices according to a stacking method of ensemble learning.

In the above-described embodiment, in a case where the above-described metadata is input to inference devices 13-1 to 13-N, the same metadata may be input to the inference devices 13-1 to 13-N, or (respectively different pieces of) metadata corresponding to each inference device 13-i may be input to inference devices 13-1 to 13-N.

What is claimed is:

1. An image recognition method comprising:
    a feature amount extracting step of generating, from an input image, a base feature map group including a plurality of base feature maps;
    an inferring step of providing a plurality of inference inputs based on the base feature map group to a plurality of machine-learned inference devices, respectively, and deriving a plurality of inference results corresponding respectively to the plurality of inference inputs, wherein the plurality of inference inputs are one or more base feature maps classified by the sizes, respectively; and
    an integrating step of integrating the plurality of inference results by using weight factors as an integrator that has been subjected to machine-learning to derive a final inference result, wherein
    each of the plurality of inference inputs is a base feature map set which includes some or all base feature maps of the plurality of base feature maps,
    the some or all base feature maps of the base feature map set are different in part or whole from one another between the plurality of inference inputs, and
    weight factors are set based on inference accuracy of the each of the plurality of inference devices by cross validation or a distribution of a specific feature amount of the input image and a distribution of the specific feature amount of an input image of training data used for machine-learning of the plurality of inference devices.

2. The image recognition method according to claim 1, further comprising an inference input generation step of generating the plurality of inference inputs from the base feature map group, wherein the inference input generation step extracts the plurality of base feature maps from the input image by a plurality of specific processes, and the base feature map set has one or more base feature maps selected from the base feature map group corresponding to the plurality of specific processes.

3. The image recognition method according to claim 2, wherein the base feature map has two-dimensional data indicating positions, sizes, and directions of a plurality of specific shapes.

4. The image recognition method according to claim 1, further comprising a machine-learning step of performing machine-learning of the plurality of inference devices, wherein the machine-learning is performed by excluding a region other than a specific partial region designated by the training data in an input image of the training data used for the machine-learning.

5. The image recognition method according to claim 1, wherein the plurality of inference inputs include data other than the one or more base feature maps selected from the base feature map group.

6. An image recognition apparatus comprising:
a processor, the image recognition apparatus causing the processor to operate as:
a feature amount extraction unit that generates, from an input image, a base feature map group including a plurality of base feature maps;
a plurality of machine-learned inference devices that respectively receive a plurality of inference inputs based on the base feature map group and derive a plurality of inference results corresponding respectively to the plurality of inference inputs, wherein the plurality of inference inputs are one or more base feature maps classified by the sizes, respectively; and
an integrator that integrates the plurality of inference results by using weight factors as an integrator that has been subjected to machine-learning to derive a final inference result, wherein
each of the plurality of inference inputs is a base feature map set which includes some or all base feature maps of the plurality of base feature maps, and the some or all base feature maps of the base feature map set are different in part or whole from one another between the plurality of inference inputs, and
weight factors are set based on inference accuracy of the each of the plurality of inference devices by cross validation or a distribution of a specific feature amount of the input image and a distribution of the specific feature amount of an input image of training data used for machine-learning of the plurality of inference devices.

7. A non-transitory computer readable recording medium storing an image recognition program executable by a processor, the image recognition program causing the processor to operate as:
a feature amount extraction unit that generates, from an input image, a base feature map group including a plurality of base feature maps;
a plurality of machine-learned inference devices that respectively receive a plurality of inference inputs based on the base feature map group and derive a plurality of inference results corresponding respectively to the plurality of inference inputs, wherein the plurality of inference inputs are one or more base feature maps classified by the sizes, respectively; and
an integrator that integrates the plurality of inference results by using weight factors as an integrator that has been subjected to machine-learning to derive a final inference result, wherein each of the plurality of inference inputs is a base feature map set which includes some or all base feature maps of the plurality of base feature maps, and the some or all base feature maps of the base feature map set are different in part or whole from one another between the plurality of inference inputs, and
weight factors are set based on inference accuracy of the each of the plurality of inference devices by cross validation or a distribution of a specific feature amount of the input image and a distribution of the specific feature amount of an input image of training data used for machine-learning of the plurality of inference devices.

* * * * *